July 19, 1966 H. ST. PIERRE 3,261,636
CLEVIS AND GRAB HOOK
Filed April 15, 1964

Inventor
Henry St. Pierre
By Charles R. Fay,
Attorney

United States Patent Office 3,261,636
Patented July 19, 1966

3,261,636
CLEVIS AND GRAB HOOK
Henry St. Pierre, 50 Frank St., Worcester, Mass.
Filed Apr. 15, 1964, Ser. No. 359,980
2 Claims. (Cl. 294—78)

This invention relates to a new and improved clevis, slip, or grab hook, and the principal object of the invention resides in the provision of a device of this nature having a detachable part to receive a separable hook, link in a chain, etc.

One of the principal objects of the invention resides in the provision of means for attaching a chain to a hook without the use of the conventional take-apart connection link but instead using a clevis that is in the form of a U having a pair of eyes at the opposite ends thereof, said eyes receiving a separable pin and one of said eyes being reduced in width so that it can slip through both the eye in the hook and in a comparable size of chain link, and thus obviating the need of using the more expensive prior art grab hook with integral clevis which is well known in the art.

Other objects and advantages of the invention will appear hereinafter.

Reference is to be had to the accompanying drawings, in which.

Figure 1:
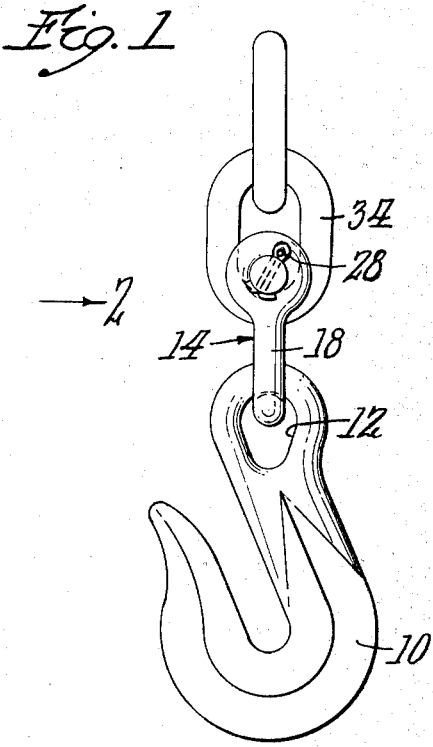
FIG. 1 is a view in side elevation illustrating the new construction.
Figure 2:
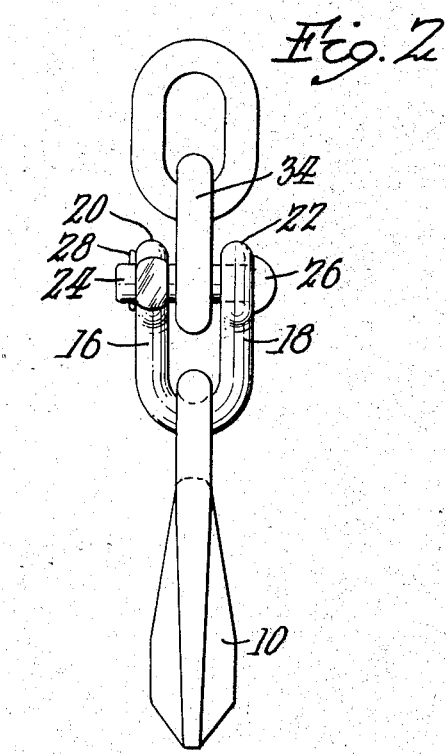
FIG. 2 is a view in elevation, looking in the direction of arrow 2 in FIG. 1.
Figure 3:
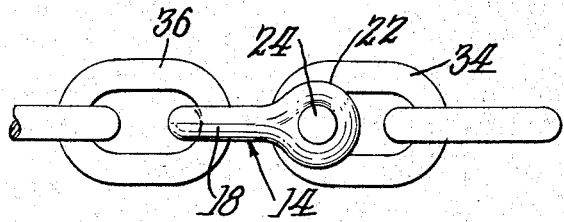
FIG. 3 illustrates the clevis used as a repair link for a chain.

In illustrating the invention there is shown in FIGS. 1 and 2 a slip or grab hook 10 which is of generally conventional shape as may be desired except that the eye 12 thereof is made in a kind of teardrop or elongated inverted pear shape as indicated at 12 for the purposes of carrying out the objects of the invention.

The clevis is generally indicated at 14. This clevis is provided with the usual parallel arms 16 and 18 which are connected together to form a U-shaped member. The arms 16 and 18 terminate in enlargements 20 and 22 respectively the same being apertured to form aligned eyes for the reception of the cross pin 24 or other fastener such as a bolt, etc. One simple and effective form for such a pin is to provide a straight cylindrical member having a head 26 and at its opposite end a cotter-pin 28. The cotter-pin is of course not always necessary as the end of the pin 24 can be peened over or screw-threaded with respect to the head 22, etc.

Figure 4:
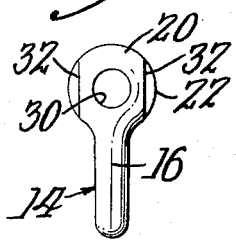
FIG. 4 is a view in side elevation of said clevis.

FIG. 4 shows the eye of the enlargement 20 indicated by the reference numeral 30 and both enlargement 20 and 22 have similar sized eyes as may be desired.

The enlargement 20 is reduced at the opposite sides thereof as at 32, 32, so that it is considerably less in width than that of the enlargement 22. The enlargement 20 may therefore be easily slipped through the elongated opening 12 in the hook although the enlargement 22 is too large and cannot extend through this opening. Thus the clevis and the hook may be connected and disconnected quickly and easily as may be desired without however any loss in strength. This is due to the fact that each side of the eye of the hook carries only one-half of the load that is carried in the shank of the hook, and insofar as the clevis is concerned each side of each aperture 30 therein carries one-quarter of the load. Also the end link 34 of a chain is easily slipped in assembled relationship with the pin of the clevis after the narrow head of the clevis is slipped through the eye 12 in the hook.

Any usual types of chains or rings may be utilized in the new clevis for being connected in the fashion recited and the clevis may be utilized as a chain connector as is indicated at 36. Ordinarily, the heads such as at 22 used for the usual size of chain cannot pass through the openings in the links but the narrow head 20 can so pass and therefore the clevis can be used as a connector for two ends of the chain or as a repair link or to connect rings, etc., as may be desired. Therefore any kind of logging or tow chain may be made up by the operator without the necessity of having to have special clevis hooks or other connectors such as are well known in the prior art.

It will be seen that this invention therefore provides a single hook 10 which by the addition of a special new and improved clevis 14 may be utilized as described for the connection of chain links, etc., without the use of take-apart connection links, and also other things such as other links of chains, rings, etc., may be assembled to chains or hooks in a manner a great deal more convenient and less expensive than specially made devices of the prior art.

Having thus described my invention and the advantages thereof, I do not wish to be limited to the details herein disclosed, otherwise than as set forth in the claims, but what I claim is:

1. The combination of a hook and a member to be attached thereto of a take-apart removable connection therefor comprising a U-shaped clevis, the clevis being insertable through the eye of the hook, said clevis including two spaced arms, an apertured head at the end of each arm, a removable pin extending between said heads, one of said heads being of a size and shape to slip through the eye of the hook, the other head being wider than the opening in said eye, the eye of the hook being elongated to such an extent that it can receive the narrower head therethrough but not to the extent that the other head can be received therethrough.

2. The combination of a hook and a chain link to be attached thereto, of a take-apart removable connection therefor comprising a U-shaped clevis, the clevis being insertable through the eye of the hook, said clevis including two spaced arms, an enlarged apertured head at the end of each arm, a removable pin extending between said heads, one of said heads being of a size and shape to slip through the eye of the hook, the other head being wider than the opening in said eye, in a direction transverse to the corresponding clevis arm, the eye of the hook being elongated to such an extent that it can receive the narrower head therethrough but not to the extent that the other head can be received therethrough.

References Cited by the Examiner
UNITED STATES PATENTS
2,837,890  6/1958  Morrill _____ 59—86

OTHER REFERENCES
Young Iron Works Catalog No. 56, Seattle, Wash., 1955 (p. 58 relied on).

GERALD M. FORLENZA, Primary Examiner.

G. F. ABRAHAM, Assistant Examiner.